March 22, 1938. J. D. BOLESKY 2,111,609
THERMOSTATICALLY CONTROLLED HEATING DEVICE
Filed April 10, 1935 2 Sheets—Sheet 1

John D. Bolesky,
Inventor,
Delos G. Haynes,
Attorney.

March 22, 1938. J. D. BOLESKY 2,111,609
THERMOSTATICALLY CONTROLLED HEATING DEVICE
Filed April 10, 1935 2 Sheets-Sheet 2

John D. Bolesky,
Inventor,
Delos F. Haynes,
Attorney.

Patented Mar. 22, 1938

2,111,609

UNITED STATES PATENT OFFICE 2,111,609

THERMOSTATICALLY CONTROLLED HEATING DEVICE

John D. Bolesky, Attleboro, Mass., assignor, by mesne assignments, to Metals & Controls Corporation, Attleboro, Mass., a corporation of Massachusetts Application April 10, 1935, Serial No. 15,569

7 Claims. (Cl. 219—25)

This invention relates to thermostatically controlled heating devices, and with regard to certain more specific features, to thermostatically controlled sadirons.

Among the several objects of the invention may be noted the provision of a thermostatically controlled heating device in which the thermostatic control is positioned for a more accurate and ready response to temperature conditions within the device than has heretofore been obtained; the provision of a thermostatically controlled heating device, such as a sadiron, which is unusually simple in construction and operation, and adapted for ready and quick assembly in the course of its manufacture; the provision of a thermostatic control particularly adapted for use in heating devices of the class described embodying as the actuating element thereof a device such as that shown in John A. Spencer Patent No. 1,895,591, dated January 31, 1933; the provision of a thermostatic control of the class described in which means are provided for conducting the heat of the device controlled directly to the control element, to provide for a more immediate response of the element to changed temperature conditions; and the provision of a device of the class described which may be adjusted to operate at varying temperatures, with the maximum of facility and accuracy. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a vertical section of a sadiron embodying the present invention;

Similar reference characters indicate corresponding parts throughout the several views of the drawings.

In John A. Spencer Reissue Patent 17,107, dated October 23, 1928, there is described and claimed a sadiron structure embodying a thermostatic control made up principally of a snap-acting thermostatic disc of smooth surface, such as shown in John A. Spencer Patent 1,448,240, dated March 13, 1923. In John A. Spencer Patent 1,895,591, dated January 31, 1933, there is shown a thermostatic element which is a considerable improvement over the element of said Patent 1,448,240, insofar as it is provided with means for obtaining a greater throw and a more ready and quick response to changing temperature conditions.

It is a principal object of the present invention to embody, in a sadiron of the type shown in said Reissue Patent 17,107, a thermostatic control utilizing a thermostatic element of the type shown in said Patent 1,895,591.

However, the advantages of the present invention are not only those that accrue due to the advantage of the Patent No. 1,895,591 type of element per se, but there are also quite a number of separate advantages to be particularized hereinafter.

These separate advantages also apply in part when a non-corrugated snap-acting thermostatic disc of the type shown in said Patent 1,448,240 is used. The corrugated disc of Patent 1,895,591 is therefore to be considered herein as in the exemplary sense only.

Figure 1:
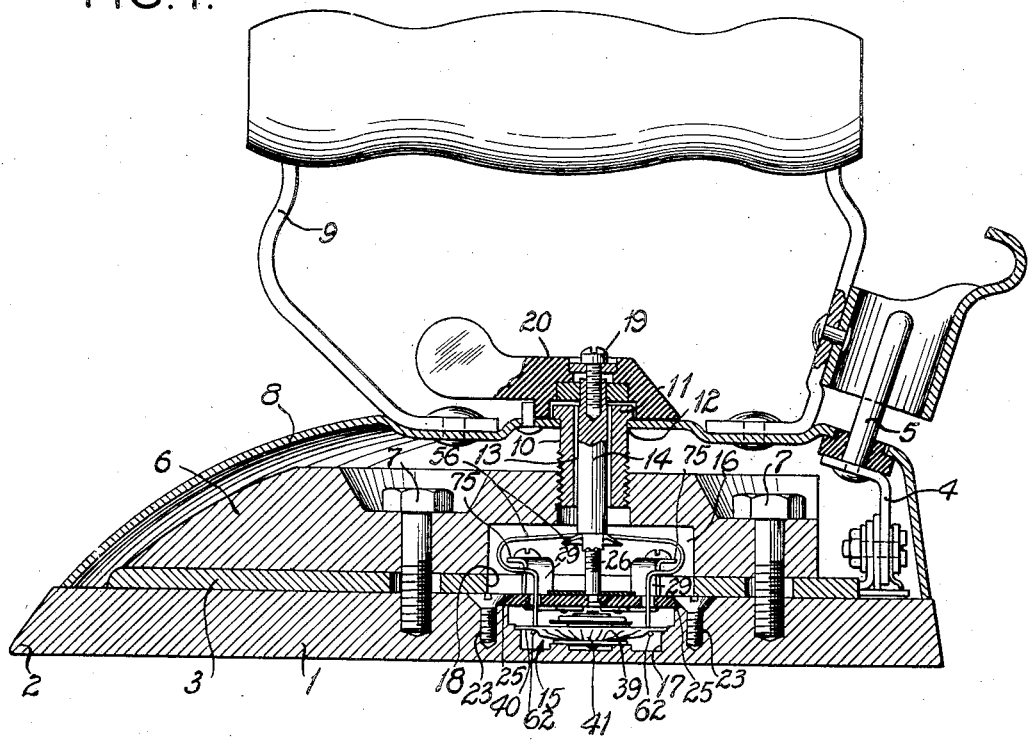

Referring now more particularly to Fig. 1, there is shown a sadiron having a metallic base member or sole plate 1, having a pointed end 2 in the front, in the usual manner. Supported on the top of the sole plate 1 is a heating element 3 of customary construction. The heating element 3 includes coils of resistance wire (not shown), the ends of which are electrically connected with flat leads 4 in turn connected with terminal plug elements 5. The terminal plug elements 5 are located on the rear portion of the iron in such a position that connection may readily be made thereto, as with an ordinary appliance plug.

Surmounting the heating element 3 is a weight member 6, ordinarily made of cast iron. The weight member 6 is held to the sole plate 1 by studs 7, which are suitably recessed into the top of the weight member 6 and threaded into the sole plate 1. These studs provide clamping force for securing the heating element in position. Enclosing the weight member 6, and the entire inner assembly of the iron, is a casing 8, which carries the usual handle 9. The casing 8 is held to the weight member 6 by means of a hollow stud 10, which is threaded into the top of the weight member and which has a relatively thin head 11 engaging the edges of a hole 12 in the casing 8. The stud 10 has a central hole 13 therein, through which passes a stem 14 for adjusting a thermostatic control assembly 15. The assembly 15 is contained within a recess 16 provided in the weight member 6, and projects into a further recess 17 in the sole plate 1. Details of the thermostatic control assembly will be set forth hereinafter. It is to be understood that there is provided, in the heating element 3, a suitable opening 18 to accommodate the thermostatic control assembly 15.

On the upper end of the stem 14 is secured, by a machine screw 19, a pointer knob 20. As is usual in devices of this type, a scale is provided on the casing 8 for suitably indicating the heating positions of the knob 20.

The sadiron as so far described is of a construction found in the open market.

The present invention is more particularly concerned, with the construction of the thermostatic assembly 15, and its combination with the sadiron. The construction of the assembly 15 is indicated in more detail in Fig. 2, to which reference is now directed.

Numeral 21 indicates a circular plate of heat-resisting metal such as steel. The plate 21 fits in a circular recess 22 in the sole plate 1, said recess 22 forming the topmost part of the recess heretofore designated by the numeral 17. Machine screws 23 are threaded into the sole plate 1, and fit against notches 25 in the plate 21 whereby to clamp said plate 21 rigidly in position.

Riveted into position, and standing vertically upwardly from the center of the plate 21, is a post 26. The post 26 is held against either vertical or rotational movement by its mounting in the plate 21. The upper end of the post 26 is threaded to receive on oppositely threaded opening 27 on the lower end of stem 14. Turning the rotatable stem 14 on the post 26 moves said stem up and down the post 26, for purposes to be indicated hereafter.

Figure 5:
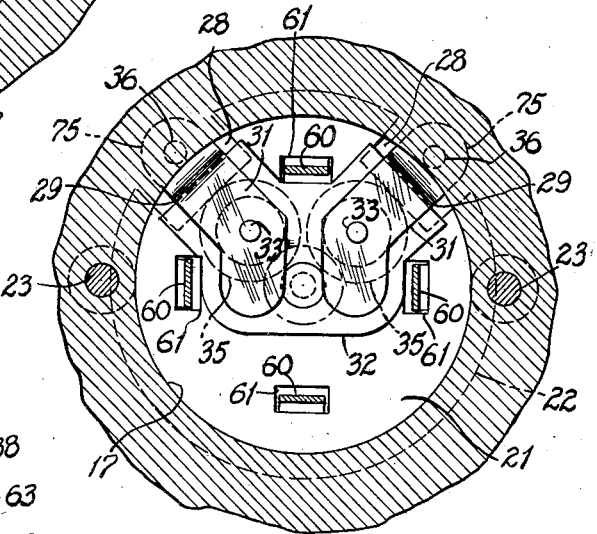
Fig. 5 is a horizontal section taken substantially along line 5—5 of Fig. 2; and, Fig. 6 is a horizontal section taken substantially along line 6—6 of Fig. 2.

Referring also to Fig. 5, it will be seen that the circular plate 21 has a pair of notches 28 provided therein at radial positions approximately 90° apart. Through these notches 28 pass the vertical portions 29 of a pair of terminal pieces 31, which terminal pieces are preferably spaced from the surface of the disc 21 by a sheet of mica or the like 32. The terminal pieces 31 are secured to the plate 21 by means of rivets 33, which pass through the plate 21, through a sheet of mica or similar material 34 (see also Figures 2 and 3) and upwardly terminate in heads 35. The exposed faces of terminal pieces 31 are preferably formed from silver or some similar metal of good electrical conductivity.

The terminal pieces have horizontal portions 75 above the plate 21, the portions 75 carrying screws 36 by which electrical connections can be made to the terminals. In the usual construction, these terminals are connected in series with parts of the heating element 3 of the iron. By connecting the terminals in series intermediate the extreme ends of the heating element 3, wiring from the plug terminals 5 direct to the control is unnecessary, and it will readily be seen that the thermostatic switch will function equally well whether it be connected in series at one end of the heating element or at any region intermediate between the ends thereof.

Returning to the recess 17 in the sole plate 1 (see Fig. 2), it will be seen that, going downwardly in said recess, there is provided a pair of portions of reduced bores establishing annular shoulders 37 and 38. The shoulder 38 is of suitable diameter to receive loosely a radially corrugated, snap-acting thermostatic disc 39, the same being made in accordance with said John A. Spencer Patent No. 1,895,591.

Figure 2:
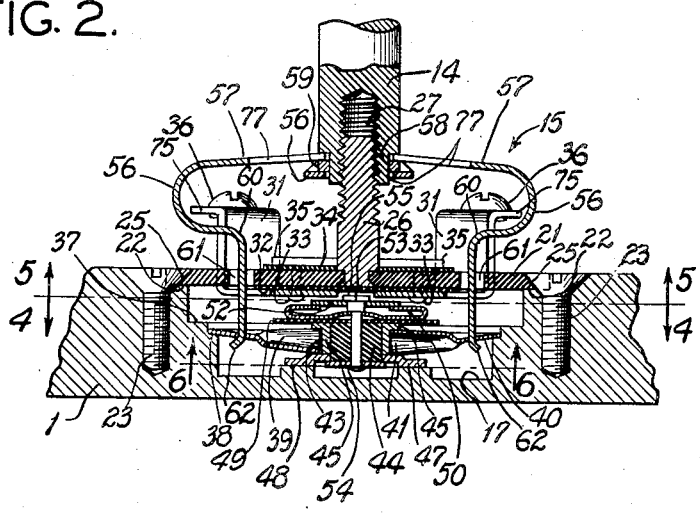
Fig. 2 is an enlarged vertical section of the thermostatic control of the sadiron of Fig. 1.

It is not necessary here to go into detail in describing the construction and operation of said disc 39, further than to say that it is formed of a suitable composite thermostatic metal (such as high temperature bimetal of the class shown in Laurence K. Marshall Patent 1,481,021), it is generally circular in shape, and it has a relatively flat peripheral rim 40 and a central portion 41 made up of closely spaced radial corrugations. A central opening 43 extends through the disc. The device, in order to function as a control element, is initially formed with a slight conicity in one direction. To sum up the operation of this element, it may be said that, when the ambient temperature reaches a predetermined value, the forces occasioned by the composite metal couple cause the disc to undergo a reversal of curvature, or change of position of conicity, with a distinct snapping action. That is to say, the disc 39 as is illustrated in Fig. 2 is in a concave position when viewed from above, but after it snaps it will be in a convex position from the same viewpoint. It is this motion of the thermostatic element 39 which achieves the control desired.

A plug 44 of insulating material such as "Lavite" fits loosely in the central opening 43 of the disc 39. On its upper end, the plug is surrounded by a ferrule 45, which likewise fits loosely in the opening 43, also surrounding the plug 44. The upper flange edge 46 of the ferrule 45 rests lightly upon the inner periphery, or corrugations, of the disc 39. The lower end of the ferrule 45 abuts a washer 47. Washer 47 is not entirely flat, having a peripheral region displaced from the plane of the remainder of the washer. This periphery normally sets upon a projecting annular or rim 48 extending upwardly from the bottom of the recess 17 in the sole plate 1.

Figure 4:
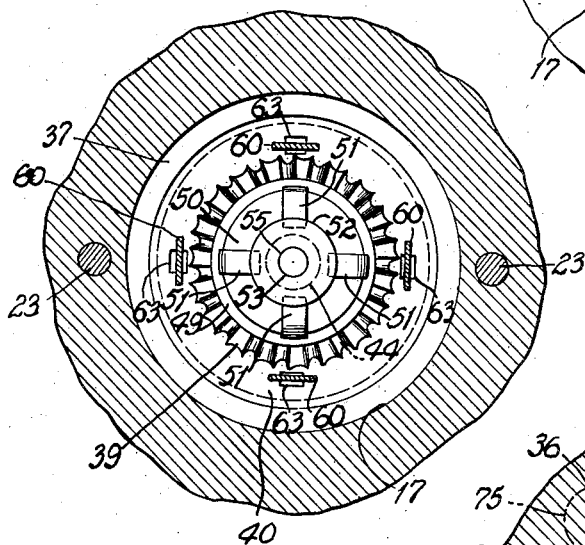
Fig. 4 is a horizontal section taken substantially along line 4—4 of Fig. 2.

Mounted on top of the plug 44, and the ferrule 45, is a mica or like disc 49. On top of the mica disc is a spring washer 50, which has fingers 51 turned radially inwardly (see also Fig. 4). The spring fingers 51 support a silver or like contact plate 52, which is circular in shape. The assembly is held together by a pin or rivet 53, one end of which rests against a washer 54 which in turn rests against the plug 44 and the edge of disc 47. The rivet in turn passes through the plug 44, the mica disc 49, the spring washer 50, and the movable contact plate 52, and has another head 55 which holds the entire assembly together. The contact plate 52 is slidable on the head 55 within the extent of the resilience of fingers 51. Further, the sleeve 45 and the disc 47, while together enclosing the inner periphery of the thermostatic element 39, do so in a relatively loose manner, so that they exert no inhibiting or restraining effect on the action of said disc.

In operation, the manner in which the rim 40 of the thermostatic disc 39 rests directly on a shoulder 38 in the sole plate 1 permits of a ready conduction of heat directly into the disc. In prior devices of this type, the heat of the sole plate reached the thermostatic element only by indirect conduction, or by radiation. This former structure resulted in an ever-present, considerable heat lag between the sole plate of the iron, which was the thing the temperature of which was supposed to be controlled, and the thermostatic element accomplishing the control, which was objectionable as it adversely affected the character and the accuracy of the control obtained. With the present invention, the heat is conducted directly in through the periphery of the disc, over a relatively large contact area, which permits of a ready and complete response to temperature change at the ironing surface of the sole plate. Thus the control is at all times in more direct thermo thermal equilibrium with the sole plate. Further, when the thermostatic control is in its hot position (with the contacts separated), the disc 47 resting upon the projection 48 provides still another path for the conduction of heat to the center of the thermostatic element 39. While this connection does not obtain when the thermostat is in its cold, or contact-closing position, it will readily be seen that it provides an improved means for at least one phase of the operation of the thermostatic control which adds the effect to that of the conduction through the periphery of the element 39 as hereinbefore described.

Figure 3:
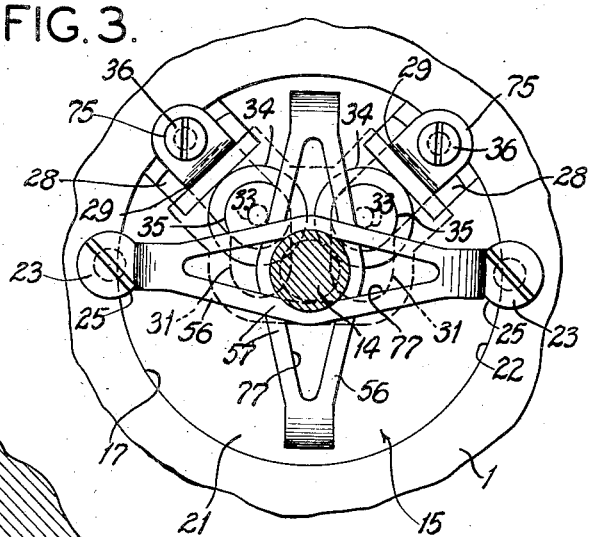
Fig. 3 is a top plan view of the control element of Fig. 2.
Figure 6:
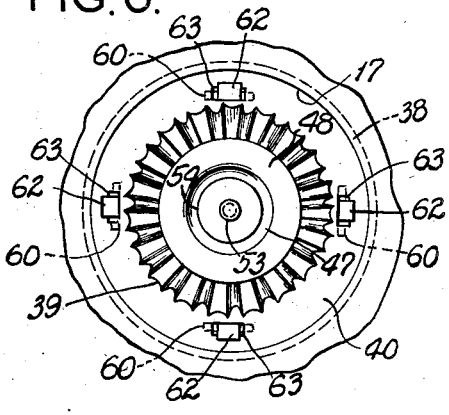

The means for adjusting the operating temperature of the thermostatic element 39, heretofore referred to, are shown in Fig. 2, and comprise a pair of bowed or U-shaped leaf spring elements 56 arranged at right angles to each other (see also Fig. 3). These spring elements comprise a relatively flat upper portion 57, which are provided with central openings 77 which narrow towards their ends. The lower end of stem 14 has a portion 58 of reduced diameter, over which the openings 77 are slipped. A washer 59 provides that neither spring 56, in flexing, will have any direct contact with or bear upon the flexing of the other spring 56. From the flat portions 57 of the spring 56 depend vertical portions 60 (the "legs" of the U-shape), which pass through suitable openings 61 in the circular plate 21, and terminate at their lower ends in ears 62 (see also Fig. 6) which project through suitable slots 63 cut in the flat periphery 40 of the thermostatic disc 39, and are bent back to hold the disc in the assembly. Prior to its being positioned in the iron, this is the sole means by which the disc is held to the control assembly. When positioned in the iron, however, the disc is supported rigidly by its resting on the shoulder 38. In initial assembly, the stem 14 is threaded down upon the post 26 to such an extent that a tension is placed upon the springs 56, this tension transmitting itself through the vertical legs 60, to the periphery 40 of the thermostatic element 39. This force tends to hold the disc 39 seated upon the shoulder 38 in sole plate 1.

In John A. Spencer Patent 1,972,832, dated September 4, 1934, the manner in which a spring element acts on a corrugated disc at a point between the center and the periphery thereof, in order to regulate the snapping temperature of the disc is described in detail. This description likewise applies to the present device. It will accordingly be unnecessary to go into detail herein as to the reasons for the temperature regulating action of the springs 56 on the disc 39. Suffice it to say that, as the stem 14 is threaded down on the post 26, to place more tension in the springs 56, the disc 39 tends more and more to snap to open circuit position, and will do so at progressively lower temperatures. Hence, when it is desired that the iron operate at as high a temperature as possible, the stem 14 should be threaded up the post 26. Threading the stem 14 down the post 26 decreases the temperature at which the disc 39 will snap, and hence lowers the automatically-controlled, operating temperature of the sadiron. Reverse operation provides adjustment in the opposite sense.

Contact is made and broken, it will be understood, by the juxtaposition of the movable contact plate 52 on the stationary contacts or terminal pieces 29. The arrangement described provides for a series break, which is advantageous inasmuch as it cuts down the voltage drop across any one break in the circuit, thereby increasing the life of the contact portions.

When the disc 39 is in position to close the switch, it will be seen that it drives the contact 52 against the terminal pieces 29. The arrangement is such that in this position a slight flexure of the spring arms 51 is occasioned. This is a feature that is provided in order to take care of the initial creep that is encountered in the thermostatic element 39 when it is commencing to move or snap to circuit-broken position. By means of the spring arms 51, the movable contact disc 52 is held firmly against the terminal plate 29 through this preliminary creepage, and until the actual over-centering snap of the disc 39 takes place, the contacts are held in firm engagement.

While the invention has been described herein in its application to an automatically controlled electric sadiron, it will readily be seen that it likewise finds adaptation to other forms of heating devices wherein direct conduction of the heat from the object, the temperature of which it is desired to regulate, can be made directly into the disc.

The ease with which the device herein described can be assembled is one of its principal advantages from the commercial standpoint. For example, in order to completely dismantle the sadiron, all that needs to be done is to remove the knob 20 by removing the screw 19, remove the stud 11 thereby removing the case 8, removing the studs 7, thereby removing the weight member 6, and removing the screws 23, whereby the entire thermostatic control can be lifted from the iron together with the heating element 3. In order to disconnect the heating element 3 from the thermostatic control, only the screw 36 need be loosened.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a device the temperature of which it is desired to regulate, an element having a recess therein, and a thermostatic control located in said recess, said thermostatic control comprising a snap-acting thermostatic plate having a relatively flat periphery, said recess having a shoulder, and means holding said periphery in direct, resilient contact with said shoulder, whereby said plate is heated and cooled by conduction from and to said element.

2. An electrically heated sadiron comprising a sole plate having a circular recess therein, and a thermostatic control mounted in said recess, said control including as the actuating element thereof a radially corrugated snap-acting thermostatic disc having a flat periphery, a shoulder in said recess, and means holding said periphery in direct, resilient contact with said shoulder, and means whereby said disc is heated by direct conduction of heat from said sole plate, and means for adjusting the temperature at which said thermostatic control operates comprising at least one resilient element bearing on the face of said disc at a point between the center and the periphery thereof.

3. In an electrically heated sadiron, a sole plate having a recess therein, a peripheral shoulder at the top of said recess, a thermostatic control received in said recess, said control comprising a plate seated against said shoulder, and a snap-acting thermostatic disc mounted on said plate, and a second shoulder in said recess against which the periphery of said disc rests in direct, resilient contact.

4. In an electrically heated sadiron, a sole plate having a recess therein, a peripheral shoulder at the top of said recess, a thermostatic control received in said recess, said control comprising a plate seated against said shoulder, a radially corrugated snap-acting thermostatic disc mounted on said plate, said disc having a relatively flat periphery, and a second shoulder in said recess against which the periphery of said disc rests in direct, resilient contact.

5. In an electrically heated sadiron, a sole plate having a recess therein, a peripheral shoulder at the top of said recess, a thermostatic control received in said recess, said control comprising a plate seated against said shoulder, a radially corrugated snap-acting thermostatic disc mounted on said plate, said disc having a relatively flat periphery, and a second shoulder in said recess against which the periphery of said disc rests in direct, resilient contact, said plate having a post rigidly mounted on the opposite side thereof from the disc, a stem threaded on said post for vertical movement thereon, and at least one resilient element reacting at one end against the disc and at the other end against the said stem.

6. In an electrically heated sadiron, a sole plate having a recess therein, a peripheral shoulder at the top of said recess, a thermostatic control received in said recess, said control comprising a plate seated against said shoulder, a radially corrugated snap-acting thermostatic disc mounted on said plate, said disc having a relatively flat periphery, a second shoulder in said recess against which the periphery of said disc rests in direct, resilient contact, said plate having a post rigidly mounted on the opposite side thereof from the disc, a stem threaded on said post for vertical movement thereon, and a pair of U-shaped leaf springs arranged so that the legs of said springs are separated approximately 90° from each other, the end of said legs bearing upon the face of said disc, and the central portion of said springs being engaged by the end of said stem, whereby, upon vertical movement of said stem, said springs impose a greater or less force upon the surface of said disc.

7. A sadiron as set forth in claim 6 in which the ends of the legs of the springs are provided with ears, and the relatively flat peripheral region of said corrugated disc is provided with openings receiving said ears.

JOHN D. BOLESKY.